Patented Mar. 19, 1940

2,194,429

UNITED STATES PATENT OFFICE 2,194,429

PRODUCTION OF CONDENSATION PRODUCTS SUITABLE AS ASSISTANTS IN THE LACQUER AND RELATED INDUSTRIES

Hans Krzikalla, Paul Garbsch, and Conrad Schoeller, Ludwigshafen-on-the-Rhine, Germany, assignors to I. G. Farbenindustrie Aktiengesellschaft, Frankfort - on - the - Main, Germany No Drawing. Application November 9, 1936, Serial No. 110,012. In Germany November 9, 1935

16 Claims. (Cl. 260—100)

The present invention relates to a process for the production of condensation products on the basis of resin alcohols and resin amines suitable as assistants in the lacquer and other industries.

We have found that valuable condensation products can be obtained by causing polyhydric alcohol substances such as polyhydric alcohols themselves or their derivatives, in particular alkylene oxides to react with resin alcohols, resin amines, their hydrogenation products or their derivatives containing at least one active hydrogen atom attached to one of the atoms oxygen or nitrogen.

Suitable resin alcohols for the present process are for example abietinol, and dihydro- and tetrahydroabietinols, obtainable by reduction of abietic acid, copalic acid and the like and also of resins occurring naturally, such as colophony, scraped resin or copal resin, for example by reduction with sodium and alcohol or with hydrogen in the presence of hydrogenation catalysts. The amines corresponding to the said alcohols, such as abietylamine and abietinylmethylamine, and acid amides from the said amines as for example acetyl-abietinylamine are also suitable as initial materials.

Polyhydric alcohols suitable for the process according to this invention are for example ethylene glycol, diethylene glycol, triethylene glycol, polyglycols, glycerine, polyglycerine, sorbitol, erythritol and derivatives of the same, such as ethylene chlorhydrin. The alkylene oxides, as for example ethylene oxide or propylene oxide, butylene oxide, epichlorhydrin, glycide and glycidic acid, are especially suitable according to this invention.

The process is preferably carried out while heating, if desired with the addition of substances promoting the splitting off of water or alkaline reacting or surface active substances having catalytic action. For this purpose, for example sodium hydroxide, potassium hydroxide, sodium acetate, sodium ethylate, bleaching earths, such as tonsil, or active carbon are suitable. When employing substances of low boiling point, such as ethylene oxide, it is preferable to work under increased pressure, for example by pressing the ethylene oxide in the gas phase and at elevated temperature into the initial material. Depending on the nature of the reaction conditions used and on the amount of polyhydric alcohol, it is possible to introduce one or more radicles of the polyhydric alcohol into resin alcohol, resin amine or the like used as initial material. For example by using ethylene oxide, it is possible to introduce into the molecule of the initial material polyglycol ether chains containing 10, 15, 20 or more -$C_2H_4$-groups.

The products obtained according to the present process possess the general formula:

$$R—X—R_1—OH$$

wherein R stands for an abietinyl radicle, X stands for an oxygen atom or one of the groups

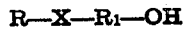

($R_2$ is an organic radicle), and $R_1$ stands for an oxyalkyl or an oxyalkyl ether radicle. They can be exploited industrially in a variety of ways depending on their physical nature. For example they may be used as alcohol-soluble resins, as softening agents for lacquers, films, resins and artificial substances, as carriers for perfumes and many like purposes. As the length of the ether chains introduced increases, the products become more and more soluble in water. Such readily water soluble products have a good dispersing power. The products obtained according to the present process are also particularly suitable as wetting and washing agents in the textile industry and as levelling agents in dyeing textile materials.

The products obtained which contain free terminal hydroxyl groups may be caused to react with reactive compounds. For example the products may be subjected to a treatment with sulphonating agents, such as sulphuric acid or chlorsulphonic acid, or condensed for example with carboxylic acids or aminocarboxylic acids, such as chloracetic acid, glycocoll or maleic, succinic or phthalic acid.

In this case products are obtained which possess the general formula:

$$R—X—R_1—OY$$

wherein R stands for an abietinyl radicle, X stands for an oxygen atom or one of the groups

($R_2$ is an organic radicle), and $R_1$ stands for an oxyalkyl or an oxyalkyl ether radicle and Y stands for an acid radicle.

The following examples will further illustrate the nature of this invention but the invention is not restricted to these examples. The parts are by weight.

Example 1

300 parts of dihydroabietinol or abietinol with an addition of 1.5 parts of potassium hydroxide are heated to from 120° to 160° C. in a stirring autoclave, 50 parts of ethylene oxide then being pressed into the melt in portions. The pressure amounts to from about 2 to 10 atmospheres. The ethylene oxide is rapidly absorbed and the hydroxyethyl ether of dihydroabietinol or of abietinol is obtained in the form of a viscous sticky resin which dissolves well in alcohol and benzene and which is eminently suitable as a softening agent in lacquers and artificial substances or as a carrier for perfumes.

If the ethylene oxide be replaced by a corresponding amount of propylene oxide, products of similar properties are obtained. If the corresponding amount of abietinylamine be used instead of dihydroabietinol, an industrially valuable condensation product is also obtained.

If one molecular proportion of the aforesaid products is heated to about 120° C. with about one molecular proportion of phthalic or maleic anhydride, esters are formed which contain a free carboxylic group. These esters also have very valuable properties.

Example 2

300 parts of dihydroabietinol with an addition of 2 parts of potassium ethylate are heated in a stirring autoclave to from about 150° to 160° C. and caused to react under pressure at the said temperature with 160 parts of ethylene oxide which is led in a little at a time in the gas phase. A wax-like product is thus obtained which consists mainly of dihydroabietinol which contains in the molecule an ether chain having about three —C₂H₄—O—groups, it is particularly suitable as assistant for combating foam.

If the ethylene oxide condensation products obtained be heated with succinic anhydride at about 120° C., the acid ester of succinic acid is formed which has good adhesive properties.

Example 3

A mixture of 600 parts of dihydroabietinol and 100 parts of epichlorhydrin is heated at 170° C. for from about 8 to 10 hours in a stirring autoclave. After cooling, a resinous, strongly adhesive product is obtained which is freed from the excess of dihydroabietinol by distillation in vacuo. The product is suitable as an additional substance to artificial compositions or to lacquers; it may also serve as a textile assistant or as an initial material for the preparation of the same.

The condensation product obtained may be caused to react with trimethylamine, whereby a quaternary ammonium salt is formed which may also be used as a textile assistant.

Example 4

300 parts of a mixture of di- and tetrahydroabietinol are heated after adding from 5 to 6 parts of sodium hydroxide to about 170° C. Then from 800 to 900 parts of ethylene oxide are led into the mixture under pressure. The mixture is then kept for some time on the same temperature and cooled down. A wax-like product is obtained which is soluble in water and which can advantageously be employed as washing agent for white goods and as dispersing agent for calcium soaps. When from 1300 to 1400 parts of ethylene oxide are employed in the present case a water-soluble condensation product is obtained which may advantageously be employed as non-foaming levelling agent in dyeing acid dyestuffs.

What we claim is:

1. The process for the production of condensation products suitable as assistants in the lacquer and other industries which comprises causing a polyhydric alcohol containing at most 6 carbon atoms to act on a compound selected from the class consisting of resin alcohols, resin amines, and their hydrogenation products containing at least one active hydrogen atom attached to one of the atoms selected from the class consisting of oxygen and nitrogen.

2. The process for the production of condensation products suitable as assistants in the lacquer and other industries which comprises causing a hydroxy ether of a polyhydric alcohol containing at most 6 carbon atoms to act on a compound selected from the class consisting of resin alcohols, resin amines, and their hydrogenation products containing at least one active hydrogen atom attached to one of the atoms selected from the class consisting of oxygen and nitrogen.

3. The process for the production of condensation products suitable as assistants in the lacquer and other industries which comprises causing an alkylene oxide containing at most 6 carbon atoms to act on a compound selected from the class consisting of resin alcohols, resin amines, and their hydrogenation products containing at least one active hydrogen atom attached to one of the atoms selected from the class consisting of oxygen and nitrogen.

4. The process for the production of condensation products suitable as assistants in the lacquer and other industries which comprises causing ethylene oxide to act on a compound selected from the class consisting of resin alcohols, resin amines, and their hydrogenation products containing at least one active hydrogen atom attached to one of the atoms selected from the class consisting of oxygen and nitrogen.

5. The process for the production of condensation products suitable as assistants in the lacquer and other industries which comprises causing ethylene oxide to act on a hydrogenation product of resin acids to resin alcohols.

6. The process for the production of condensation products suitable as assistants in the lacquer and other industries which comprises causing a comparatively large amount of ethylene oxide to act on a compound selected from the class consisting of resin alcohols, resin amines, and their hydrogenation products and containing at least one active hydrogen atom attached to one of the atoms selected from the class consisting of oxygen and nitrogen.

7. The process for the production of condensation products suitable as assistants in the lacquer and other industries which comprises causing about 30 molecular proportions of ethylene oxide to act on 1 molecular proportion of a resin alcohol.

8. The process for the production of condensation products suitable as assistants in the lacquer and other industries which comprises causing a substance selected from the class consisting of polyhydric alcohols containing at most 6 carbon atoms, and the halogen alcohols, hydroxy ethers and alkylene oxides derived therefrom to act on a compound selected from the class consisting of resin alcohols, resin amines, and their hydrogenation products containing at least one active hydrogen atom attached to one of the atoms selected from the class consisting of oxygen and nitrogen and introducing into the reaction product a polyvalent acid radicle.

9. The process for the production of condensation products suitable as assistants in the lacquer and other industries which comprises causing a substance selected from the class consisting of polyhydric alcohols containing at most 6 carbon atoms, and the halogen alcohols, hydroxy ethers and alkylene oxides derived therefrom to act on a compound selected from the class consisting of resin alcohols, resin amines, and their hydrogenation products containing at least one active hydrogen atom attached to one of the atoms selected from the class consisting of oxygen and nitrogen and condensing the reaction products with a polycarboxylic acid while providing that at least one unaltered carboxylic group is present in the reaction product.

10. A substance suitable as assistant in the textile and other industries corresponding to the formula:

$$R-X-R_1-O-Y$$

wherein R stands for an abietinyl radicle, X stands for an oxygen atom, $R_1$ stands for a member selected from the group consisting of oxyethyl and oxyethyl ether radicles derived from a polyhydric alcohol containing at most 6 carbon atoms, and Y stands for a member selected from the group consisting of hydrogen and acid radicles.

11. A substance suitable as assistant in the textile and other industries corresponding to the formula:

$$R-X-R_1-O-Y$$

wherein R stands for an abietinyl radicle, X stands for the group $$-\underset{R_2}{N}-$$

($R_2$ is a member of the group consisting of low molecular hydrocarbon and acyl radicles), $R_1$ stands for a member selected from the group consisting of oxyethyl and oxyethyl ether radicles derived from a polyhydric alcohol containing at most 6 carbon atoms, and Y stands for a member selected from the group consisting of hydrogen and acid radicles.

12. A substance suitable as assistant in the textile and other industries corresponding to the formula:

$$R-X-R_1-O-Y$$

wherein R stands for an abietinyl radicle, X stands for the group $$-\underset{R_2}{N}-$$

and $R_1$ and $R_2$ stand for a member selected from the group consisting of oxyethyl and oxyethyl ether radicles derived from a polyhydric alcohol containing at most 6 carbon atoms, and Y stands for a member selected from the group consisting of hydrogen and acid radicles.

13. A substance suitable as assistant in the textile and other industries corresponding to the formula:

$$R-X-R_1-O-Y$$

wherein R stands for an abietinyl radicle, X stands for an oxygen atom, $R_1$ stands for a member of the group consisting of oxyethyl and oxyethyl ether radicles derived from a polyhydric alcohol containing at most 6 carbon atoms and Y stands for the radicle of a polybasic carboxylic acid containing at least one unaltered carboxylic group.

14. A substance suitable as assistant in the textile and other industries corresponding to the formula:

$$R-O-R_1-O-H$$

wherein R stands for an abietinyl radicle, and $R_1$ stands for $(C_2H_4-O)_{29}-CH_2-CH_2-$.

15. The process for the production of condensation products which comprises causing a substance selected from the class consisting of polyhydric alcohols containing at most 6 carbon atoms and the halogen alcohols, hydroxyethers and alkylene oxides derived therefrom to act on a compound selected from the class consisting of resin alcohols, resin amines and their hydrogenation products containing at least one active hydrogen atom attached to one of the atoms selected from the class consisting of oxygen and nitrogen.

16. A substance suitable as assistant in the textile and other industries corresponding to the formula:

$$R-X-R_1-O-Y$$

wherein R stands for an abietinyl radicle, X stands for a member of the group consisting of $-O-$, $-NH-$ and $$-\underset{R_2}{N}-$$

($R_2$ is a member of the group consisting of low molecular hydrocarbon and acyl radicles), $R_1$ stands for a member selected from the group consisting of hydroxyalkyl- and hydroxyalkyl ether radicles derived from a polyhydric alcohol containing at most 6 carbon atoms and Y stands for a member selected from the group consisting of hydrogen and acid radicles.

HANS KRZIKALLA.
PAUL GARBSCH.
CONRAD SCHOELLER.